United States Patent [19]

Kottwitz et al.

[11] Patent Number: 4,687,347
[45] Date of Patent: Aug. 18, 1987

[54] AXIAL JOINT ARRANGEMENT WITH INTEGRATED SEAL

[75] Inventors: Bernd Kottwitz; Norbert Löser, both of Püttlingen, Fed. Rep. of Germany

[73] Assignee: SKF GmbH, Schweinfurt, Fed. Rep. of Germany

[21] Appl. No.: 829,430

[22] Filed: Feb. 13, 1986

[30] Foreign Application Priority Data

Feb. 16, 1985 [DE] Fed. Rep. of Germany ... 8504433[U]

[51] Int. Cl.⁴ ............................................. F16C 25/04
[52] U.S. Cl. .................................... 384/141; 384/206; 384/208; 403/125; 403/288
[58] Field of Search ............... 384/141, 145, 206, 208, 384/213; 403/125, 124, 122, 288

[56] References Cited

U.S. PATENT DOCUMENTS

| | | | |
|---|---|---|---|
| 2,571,443 | 10/1951 | Hair | 403/125 |
| 3,149,855 | 9/1964 | Aldoff et al. | 403/125 |
| 4,273,461 | 6/1981 | Kjellstrand et al. | 403/125 |
| 4,483,569 | 11/1984 | Smith | 384/145 |

*Primary Examiner*—Lenard A. Footland
*Attorney, Agent, or Firm*—Rosen, Dainow & Jacobs

[57] ABSTRACT

An axial joint arrangement with integrated seal is provided with three successively arranged bearing rings, the upper and lower bearing rings having spherical guiding surfaces which oppose corresponding spherical surfaces of the middle bearing ring. The upper and lower bearing rings are connected and the middle bearing ring slides therebetween. The guiding surface of the lower bearing ring serves to center and guide the middle bearing ring and the guiding surface of the upper bearing ring serves to transmit operating loads to the middle bearing ring. A first sealing disk is attached to the middle bearing ring. One face of the first sealing disk abuts a first sealing surface and the other face abuts an intermediate disk. The intermediate disk is sealingly connected by a bellows to a second sealing disk, which is in turn connected to a second sealing surface.

6 Claims, 1 Drawing Figure

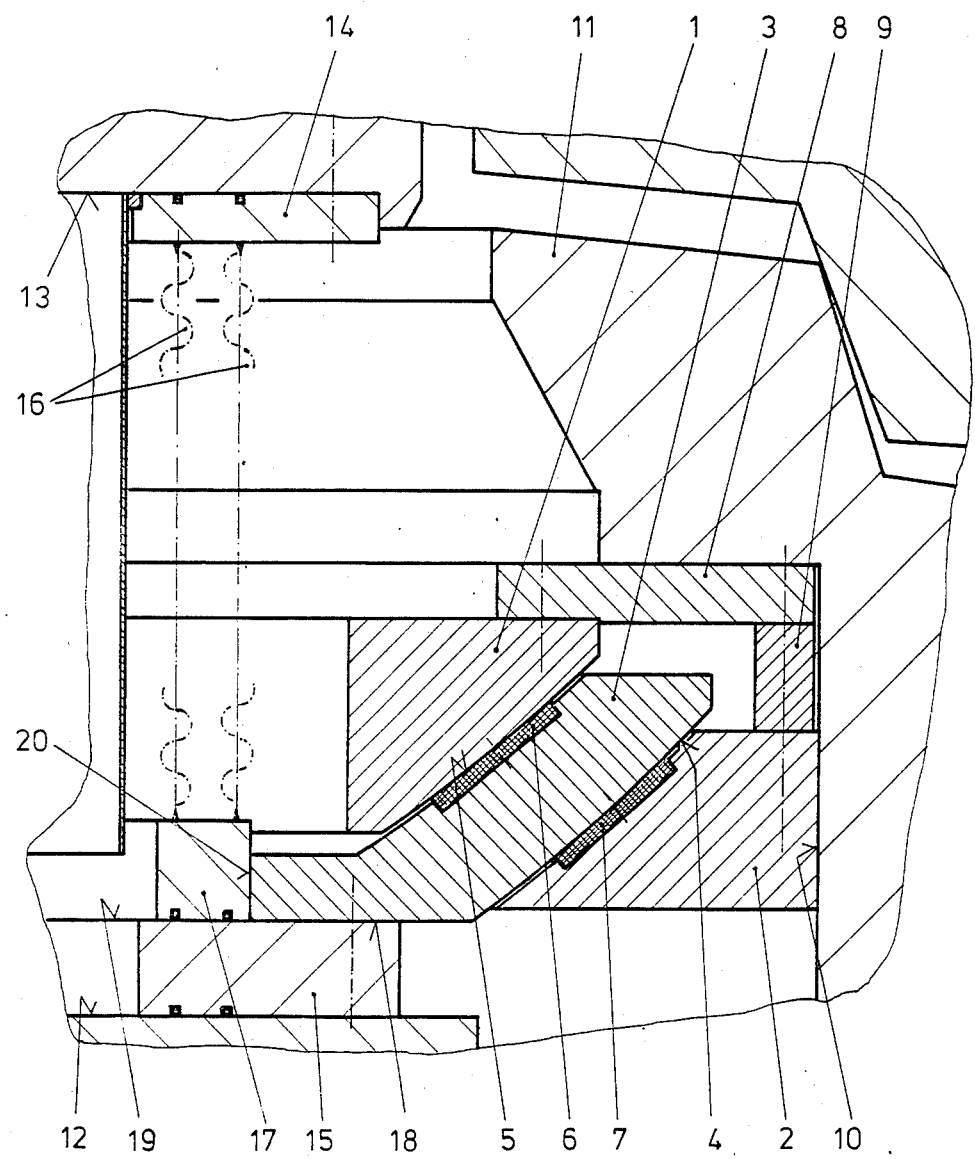

AXIAL JOINT ARRANGEMENT WITH INTEGRATED SEAL

FIELD OF THE INVENTION

The invention relates to an axial joint arrangement with integrated seal, adapted especially, for sealing between cover surfaces of transport carriages and base surfaces of a lock in a nuclear power station, consisting of three successively arranged bearing rings with spherical sliding, i.e. guiding, surfaces, wherein both axially outer bearing rings are connected to each other, one bearing ring having a surface for centering and guiding a middle bearing ring and the other having a sliding surface for transmitting an operating load to the middle bearing ring.

BACKGROUND OF THE INVENTION

An axial joint arrangement of the foregoing type is disclosed in DE-OS No. 2046516 and serves as a journal bearing for the pivot mounting of a railroad vehicle.

Further, a seal comprising two sealing disks is known from DE-PS No. 1183313, wherein a sealing disk radially adjustable by means of a bellows is connected with a housing. This known arrangement is unsuitable for a seal between two surfaces which are not in parallel planes.

BRIEF SUMMARY OF THE INVENTION

The object of the invention is to produce an axial joint arrangement of the above-described type which is provided with means for sealing between two axially displaced surfaces which may diverge from plane parallelism.

This object is achieved in accordance with the invention by providing a sealing disk on the middle bearing ring, one face of the sealing disk abutting a first sealing surface and another face abutting an intermediate disk. The intermediate disk is connected with a bellows or the like and a second sealing disk. The second sealing disk is joined to a second sealing surface. By this means the seal assumes a centered position, so that radial movement is possible only in the area of seal elasticity and after adjustment of the middle bearing ring the external loads act symmetrically in the circumferential direction and radially in the seal lateral section.

A further characteristic of the invention is that the intermediate disk connected to the bellows is centrally arranged in the bore of the middle bearing ring and both axially outer bearing rings of the joint arrangement are connected to preclude relative rotation by means of a rigid or elastic connecting element. In addition, the bearing ring adjacent the housing is fixed in a bore of the housing. By these measures it is achieved that during the required axial movement of the housing e.g. during the closing and sealing operations in the lock of the nuclear power station, the entire bearing unit is self-supporting and cannot fall apart, in the course of which the movable parts are centered or forcibly guided and easily adjustable.

BRIEF DESCRIPTION OF THE DRAWING

The invention will be described in greater detail with reference to the single FIGURE of the drawing, which is a sectional view of the preferred embodiment, the drawing showing only a portion thereof to the right of the shaft axis.

DETAILED DESCRIPTION OF THE PREFERRED EMBODIMENT

The axial universal joint arrangement shown in the FIGURE comprises an annular upper bearing ring 1, an annular lower bearing ring 2 and an annular middle bearing ring 3 arranged between the two rings 1 and 2, the rings having vertical axes in the drawing. Bearing ring 3 has a convex lower bearing surface 4 and a concave upper bearing surface 5 which face concave and convex spherical bearing surfaces respectively of bearing rings 1 and 2 respectively. The bearing rings 2, 3 are provided with preferably annular sliding inserts 6, 7 made of a maintenance-free sliding material in grooves in their upper surfaces, and bearing on the convex surfaces of rings 1 and 3 respectively. The upper bearing ring 1 is either rigidly or elastically connected to the lower bearing ring 2 by connecting elements 8, 9. The securement of the joint arrangement in the bore 10 of housing 11 is effected by means of the lower bearing ring 2. The axial operating load is transmitted to the lower sealing surface 12 extending transversely of the shaft by way of the upper bearing ring 1 and middle bearing ring 3, which can adjust in accordance with conditions. Between a first sealing surface 12 and a second sealing surface 13, which may diverge from being in substantially parallel planes, a seal is arranged comprising two annular sealing disks 14, 15, a bellows such as double wall bellows 16 or the like, and an annular intermediate disk 17. The lower sealing disk 15 is attached to the surface 18 of the middle bearing ring 3 and has a contact surface 19 on which the intermediate annular disk 17 is seated. The intermediate disk 17 is connected to the bellows 16 and centered in the bore 20 of the middle bearing ring 3. The lower sealing disk 15 conforms to the surface of the sealing surface 12, whether oblique or not, so that deformation of the housing 11, e.g. as a result of variations in loading and temperature, can be accommodated by the joint arrangement. The upper sealing disk 14 is attached to the upper sealing surface 13 and connected to the bellows 16.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. An axial joint arrangement with integrated seal having first, second and third successively arranged bearing rings, said third bearing ring lying between said first and second bearing rings, said first and second bearing rings having spherical guiding surfaces which slidably abut respective spherical bearing surfaces on said third bearing ring for enabling relative rotation of said third bearing ring therebetween, said guiding surface of said first bearing ring serving to center and guide said third bearing ring and said guiding surface of said second bearing ring serving to transmit operating loads to said third bearing ring; the improvement wherein a first sealing disk is attached to said third bearing ring, said first sealing disk having a first face arranged to abut a first sealing surface and a second surface arranged to abut an intermediate disk, said intermediate disk being connected to a second sealing disk by way of an axially flexible sealing element, said second sealing disk being connected to a second sealing surface.

2. The axial univeral joint arrangement with integrated seal as defined in claim 1, wherein said first and second bearing rings are connected by a rigid connecting element.

3. The axial univeral joint arrangement with integrated seal as defined in claim 1, wherein said first and second bearing rings are connected by an elastic connecting element.

4. The axial univeral joint arrangement with integrated seal as defined in claim 1, wherein said first bearing ring is arranged in a bore of a housing.

5. The axial univeral joint arrangement with integrated seal as defined in claim 1, wherein said intermediate disk is centrally arranged in a bore of said third bearing ring.

6. The axial univeral joint arrangement with integrated seal as defined in claim 1, wherein said axially flexible sealing element comprises a bellows.

* * * * *